July 30, 1974  E. D. GREEN  3,826,807

METHOD OF DIFFUSION MOLDING

Original Filed Sept. 30, 1971  3 Sheets-Sheet 1

United States Patent Office 3,826,807
Patented July 30, 1974

---

3,826,807
METHOD OF DIFFUSION MOLDING
Eugene D. Green, La Mesa, Calif., assignor to General Dynamics Corporation, San Diego, Calif.
Original application Sept. 30, 1971, Ser. No. 185,111, now Patent No. 3,743,455. Divided and this application Jan. 30, 1973, Ser. No. 327,895
Int. Cl. B22f 3/04
U.S. Cl. 264—39                        5 Claims

ABSTRACT OF THE DISCLOSURE

The method of diffusion molding cubically-shaped metal granules into a workpiece comprises cleaning the granules, depositing them into the cavity of a tooling mold, vibrating the tooling mold to orient the interfaces of the cubical granules into alignment with one another, encapsulating the tooling mold in a sealed enclosure, evacuating the enclosure, applying heat and pressure to the enclosure to effect diffusion molding of the granules into a workpiece configuration, and removing the workpiece from the enclosure and reusable tooling mold.

CROSS-REFERENCE TO RELATED APPLICATIONS

This application is a division of U.S. Patent Application Ser. No. 185,111 now U.S. Pat. 3,743,455, filed Sept. 30, 1971.

BACKGROUND OF THE INVENTION

The present invention is particularly concerned with the production of high density parts and structural shapes by diffusion molding homogeneous metal granules in a vacuum pack mold. Metal granules usually are irregular in shape and consequently do not lend themselves for use in diffusion molding of high strength members due to the low density of the molded end product. Although diffusion does occur between the individual granules regardless of shape, the finished product lacks the density of the base material of the granules. Voids and pockets form in the diffused material as a result of the irregularity of the interfaces of adjacent individual granules. Upon magnification of the finished part, voids are readily discernable, regardless of the size of the granules used.

SUMMARY OF THE INVENTION

The diffusion molding method of the present invention utilizes an apparatus comprising an enclosure containing tooling for diffusion molding metal granules into a structure or workpieces. The individual components of the tooling are arranged to define a mold cavity in which metal granules to be diffusion molded are contained. The tooling is spaced from the interior of the enclosure by a plurality of collapsible support members which serve to permit synchronized movement of select individual tooling components during the diffusion molding operation. Pressure members extend into the mold cavity in slidable engagement with the walls thereof to transmit compressive force applied to the vacuum pack enclosure directly on the column of granules contained within the cavity. A conduit communicates with the interior of the enclosure to provide means for purging and evacuating the enclosure immediately prior to its use in diffusion molding.

In preparing the diffusion molding apparatus for use, the entire pack assembly, i.e., enclosure, collapsible supports, tooling, and pressure members, are first chemically cleaned by immersing in a suitable cleaning solution to remove all traces of contamination. Thereafter the tooling components are heat treated to a temperature and for a time sufficient to grow a tight oxide coating thereon. The oxide coating serves as a stop-off or parting agent to facilitate disassembly of the tooling components and removal of the workpiece from the tooling mold. The coated tooling components may then be assembled on the enclosure base resting on the collapsible supports. The tooling is arranged such as to define a mold cavity having a configuration commensurate with the desired shape of the workpiece. The diffusion molding apparatus or pack assembly is now ready for filling with molding material.

The molding material as used in the above described apparatus may be fabricated by one or more methods in order to produce metallic granules of cubical shape. Exemplary of one method of fabrication is by slicing a length of square in cross section material into equal lengths. The granules produced by such method are thereafter chemically etched and thereafter retained in a cleaning solution until such time as they are transferred to the mold cavity of the apparatus. One retention solution suitable for this purpose is methylethylketone.

Subsequent to the assembly of the components of the coated tooling into the desired configuration, a measured quantity of cleaned granules is transferred from the retention solution into the cavity of the tooling mold. Depending on the particular shape desired, additional tooling components may then be added to complete the tooling assembly as required to manufacture the more complex configurations. Usually where complex shapes are to be molded, an additional measured quantity of cubical granules is transferred from the cleaning solution into the new-formed cavities created by the additional tooling. In the preferred method of diffusion molding, the tooling mold is continuously vibrated during the transfer or filling operation in order to orient the interfaces of the individual cubes into alignment with one another. After filling the mold to a predetermined level, suitably cleaned pressure members in the form of strips or bars are slidably inserted in the cavities of the tooling mold with a pressure face thereof in direct contact with the interface of the loose cubical granules and an oppositely disposed pressure face outstanding from the mold cavity. With the pressure members in position, the enclosure is completed by positioning a cover plate to rest on the outstanding pressure face of the pressure members and installing side closures around the sides in contact with the base and cover. The side closures are secured to the base and cover by continuous welds extending along the abutting edges of the base to closure and cover to closure. A conduit having one end communicating with the cavity of the tooling mold and the opposite end thereof connected to a supply source of inert gas such as Argon, conducts the gas into the enclosure during welding of the side closure in order to avoid contaminating the tooling components and molding materials as a result of oxidation. After the enclosure is properly sealed and tested against leakage, air is evacuated through the conduit whereupon the area thus evacuated is thoroughly flushed with alternate cycles of evacuation and back flushings with inert gas injected into the enclosure under pressure through the conduit. Upon completion of the flushing operation, the Argon gas is evacuated and a vacuum developed and maintained throughout subsequent operations by sealing the end of the conduit as by hot forging. The completed pack assembly is next heated until the total pack and its content are uniformly heated to the transition temperature of the metallic granules contained in the mold. While elevated to this temperature, a compressive force is applied to the enclosure of sufficient magnitude to cause collapse of the side closure of the enclosure thereby reducing the total pack thickness and forcing the pressure members to penetrate deeper into the mold cavity. As the application of compression force continues, the pressure members penetrate deeper into the vertical mold cavities compressing the granules until the enclosure cover limits penetration by engaging the mold cavity tooling. Thereafter, further movement of the cover results in collapse of the collapsible supports under certain of the tooling components to effect diffusion molding of the granules contained in the mold cavities which lie in horizontal or out of vertical planes to complete fabrication of the diffusion molded workpiece. The enclosure is then cooled and disassembled to remove the oxide and contaminate-free finished workpiece.

It is an object of the present invention to provide a method of diffusion molding of metallic granules into a workpiece in which the density thereof is equivalent to the density of the metallic granules.

Still another object of this invention is to provide a diffusion molding method by which workpieces of complex and difficult configuration may be manufactured.

Another object of this invention is to provide a method by which parts and workpieces may be manufactured in a finished condition without requirement for subsequent machining operations.

Other objects and advantages of the present invention will become more apparent in consideration of the following detailed description in which like reference numerals designate like parts of the invention throughout the several views of the drawings.

BRIEF DESCRIPTION OF THE DRAWINGS

Referring now to FIGS. 1 and 2, an encapsulation pack assembly generally designated by the numeral 10, comprises an enclosure 12 having a base plate 14, sides 16, and a cover plate 18. The sides 16 are fabricated from a lighter gauge material than that of the base plate 14 and cover plate 18 in order to provide for deformation thereof as occurs during diffusion molding and as will be hereinafter further discussed. Positioned in the enclosure 12 is the tooling generally designated 20 which defines the configuration of the mold cavity. In the embodiment illustrated in FIGS. 1 and 2, the mold cavity for the desired configuration of the finished workpiece P is substantially U-shaped having a centrally located flange or rib C intermediate side flanges S depending from a flat web or bottom portion B. Transverse flange members T integral with and depending from web portion B, connect central flange C with side flanges S. One end of the U-shaped workpiece P is closed by end flange member E which is also integral with and connects to web B and flanges C and S.

Figure 1:
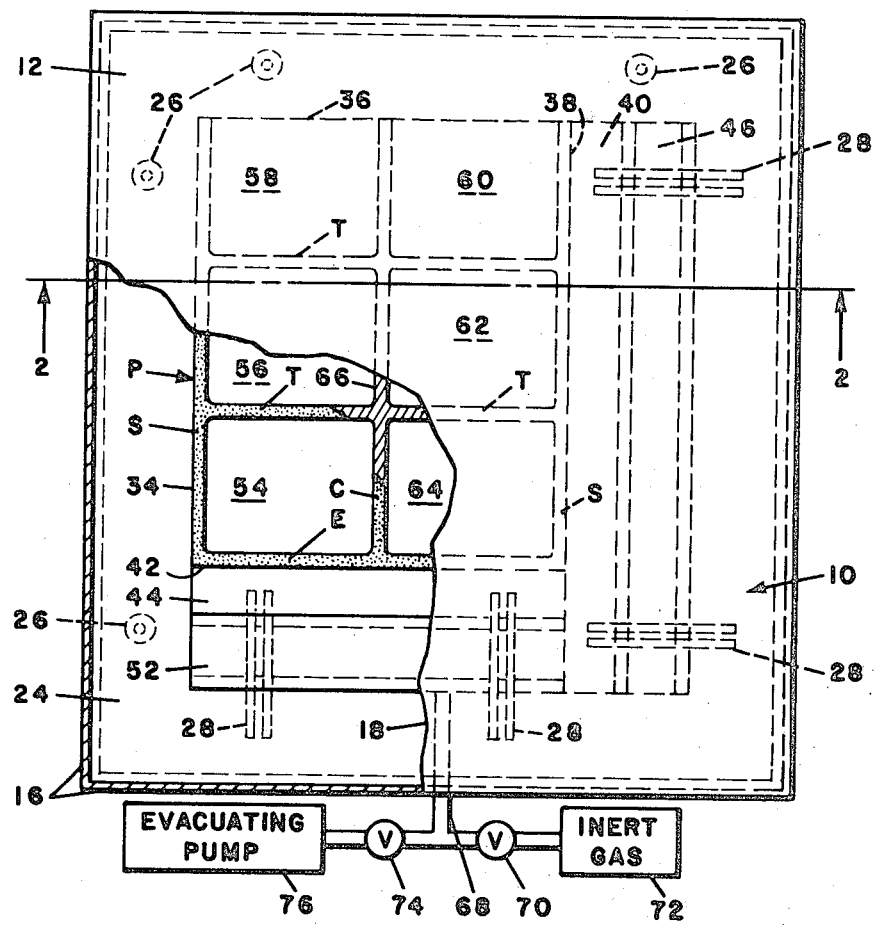
FIG. 1 is a top plan view, partly in section and in phantom, of the encapsulation assembly of the present invention.

The tooling 20 necessary to produce the workpiece P comprises a mold bottom plate 22 which rests on the base plate 14 of the enclosure 12. Surrounding the bottom plate 22 is a yoke member 24 which is spaced above base plate 14 by a plurality of collapsible supports 26 and 28. The supports 26 are substantially mushroom-shaped having a shank or stem portion and an enlarged head portion. The shank portion bottoms in a counterbored recess 30 in the base plate 14 to maintain the yoke member 24 elevated a distance above the surface of the base plate 14 prior to the diffusion molding operation. Supports 28 are elongated members having a substantially T-shaped cross-section. Elongated T-shaped recesses 32 in the base plate 14 receive the vertical bar of the supports 28 to maintain elevation of the yoke 24 to the elevation established by the supports 26. Although the supports 26, 28 elevate the yoke 24 above the base plate 14, it is to be noted that the elevation height does not exceed the thickness or gauge of the bottom plate 22 in order to effect a slight overlap condition therewith. Yoke member 24 as viewed in plan (FIG. 1), is of picture frame configuration having internal walls 34 and 36 slidably engaged and partially overlapping with mating edges of the bottom plate 22. Walls 34 and 36 form one side and one end wall of the external walls of the cavity mold. The external cavity mold wall opposite wall 34 is the face 38 of a side bar 40 while the external cavity mold wall opposite wall 36 is the face 42 of a transverse side bar 44. Side bar 40 is spaced above base plate 14 by the collapsible supports 28 at an elevation commensurate with that of the yoke 24. A wedge-shaped bar 46 sandwiched between an inner inclined wall 48 of the yoke 24 and an outer inclined wall 50 of the side bar 40 serves to maintain side bar 40 in sliding overlapping engagement with a mating edge of the bottom plate 22. Transverse side bar 44 is similarly spaced above base plate 14 by collapsible supports 28 and is maintained in sliding overlapping engagement with a mating edge of the bottom plate 22 by a wedge-shaped bar 52 similar to the bar 44 interposed between inclined walls of yoke 24 and bar 44.

The individual components of the encapsulation pack assembly 10 as hereinbefore described, are preferably fabricated from a suitable non-corrosive material such as stainless steel. Thus the probability of contamination due to outgassing is minimized or entirely eliminated as may otherwise occur with the use of other materials when they are heated to the transition temperature of the metallic granules of the workpiece.

Upon assembly of bottom plate 22, yoke 24, collapsible supports 26, 28, side bars 40, 44 and wedge bars 46, 52 on base plate 14, a measured quantity of cubical granules is deposited on bottom plate 22 to form the web B of the workpiece P. Support tooling 54, 56, 58, 60, 62 and 64 of dimensions allowing for the desired thickness of workpiece flanges C, E, S and T, are positioned on the cubical granules of web B whereupon the mold cavities for these flanges are filled with a measured quantity of cubical granules to the height desired. Pressure member 66 is a unitary grid structure, or a grid structure formed of individual bars or strips which rest on the cubical granules that form the flanges C, E, S, and T of workpiece P. If desired, pressure member 66 may be attached directly to, or made integral with the cover plate 18 of the enclosure 12. Pressure member 66 projects out of the mold cavities to space cover plate 18 of enclosure 12 from the tooling 20. Sides 16 of the enclosure 12 are joined to base plate 14 and cover plate 18 by vacuum seal welding along the pheripheral edges thereof.

An important feature of the present invention is the orientation of the interfaces of the cubical granules into alignment with one another to effect a uniform checkerboard pattern. In order to effect this alignment the pack together with the mold tooling and associated components, is continuously vibrated as the loose cubical granules are poured into the mold cavities. The vibration continues until such time as the mold cavities are filled and settling of the granules is complete. Thereafter the pressure members 66, cover plate 18 and sides 16 may be assembled as hereinbefore described.

A conduit 68 projects through side 16 and yoke 14 to selectively conduct an inert gas 72 such as Argon into the encapsulated pack assembly 10 through a valve 70. The inert gas is supplied under positive pressure to the entire assembly during the assembly to protect the surfaces of the cubical granules to be diffusion molded from oxidation or the like. After the enclosure 12 is sealed, inert gas is pumped into the inner volume thereof in and around the tooling and molding material. The pack assembly is then evacuated through the evacuation valve 74 by an evacuation pump 76 in communication with the conduit 68. During evacuation, inert gas 72 is used to flush the inner volume of the encapsulation pack assembly 10 and to dispel unwanted gases and moisture and the like from the interior thereof.

Prior to assembly, the individual parts of the encapsulation pack assembly are heated to a degree by which the parts are discolored to a pale yellow. This is the lowest color in the tempering color spectrum and reflects a thin oxide coating on the surfaces of the metal parts. This oxide coating does not adhere to the cubical granules joined during the diffusion molding process and thus the coating facilitates economical disassembly of the encapsulated assembly. Accordingly, the encapsulation pack, including tooling and collapsible supports, is reusable in continued repetitive production.

The metallic cubical granules used in molding the workpiece P must be free from contamination in order to assure proper diffusion of the individual granules to one another. Consequently in preparation for diffusion molding, the granules are chemically etched and subsequently immersed in a suitable retention solution such as methylethylketone. The granules are retained in the retention solution until such time as they are transferred into the mold cavity of the encapsulation pack assembly.

After the encapsulation pack 10 has been suitably sealed and flushed approximately 3 or more cycles of evacuation and backflushing with an inert gas, a final vacuum is drawn on enclosure 12 by opening valve 74 in communication with the evacuating pump 76. Upon reaching a vacuum reading of approximately $10^{-5}$ mm. of mercury, valve 74 is closed and the conduit 68 is sealed by hot forging while the assembly is under vacuum. The evacuation, conduits, valves, inert gas, and evacuating pump are thus disconnected from the encapsulation pack by severing and sealing the exposed end of the conduit 68. The entire diffusion mold pack is then placed in a suitable furnace having accurate temperature controls which are set to, but not exceeding a temperature that is slightly below the transition temperature of the material of the cubical granules of the workpiece. After maintaining the pack at this temperature for a time sufficient to permeate all pack components, the pack assembly is removed and pressure is applied against cover plate 18 and base plate 14 by utilization of a mechanical press or the like. This moves the plates towards one another, forcing pressure members 66 into their respective cavities in the tooling 20 until the cover plate 18 engages the tooling 20. Continued application of pressure results in the collapse of the collapsible supports 26, 28, into their respective recesses 30, 32 as the tooling, i.e., yoke 24, side bars 40, 44, wedge bars 46, 52 and support tooling 54–64, moves towards base plate 14 and bottom plate 22. As previously generally discussed, the sides 16 are of a lighter gauge deformable material which is adapted to deform or bow without rupture of its welded connections as the thickness of the pack assembly is reduced. Movement of the cover plate 18 towards the base plate 14 is limited by engagement of the yoke 24 with the base plate 14. Thus the compression force applied to cover plate 18 and base plate 14 is transmitted sequentially through pressure members 66 into the flanges C, E, S, and T of the workpiece P, and thereafter into the web B thereof to diffusion mold the cubical granules into a workpiece of a uniform density commensurate with the density of the base material of the workpiece. The assembly is then removed and allowed to air cool after which the vacuum seals are broken and the assembly is disassembled to remove the finished workpiece.

Figure 2:
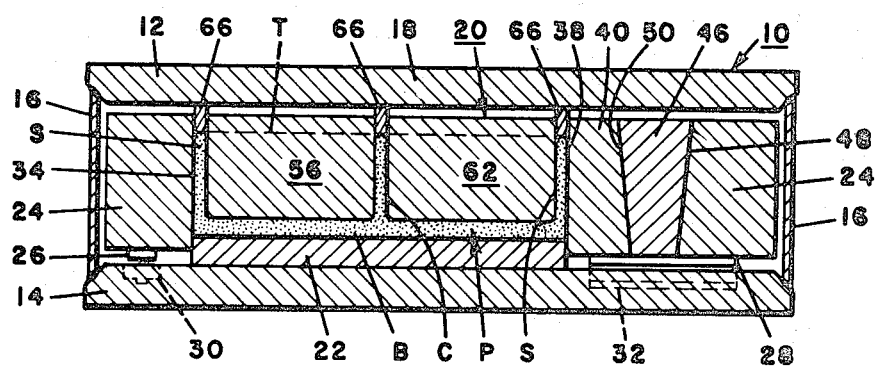
FIG. 2 is a cross-sectional view taken along line 2—2 of FIG. 1.
Figure 3:
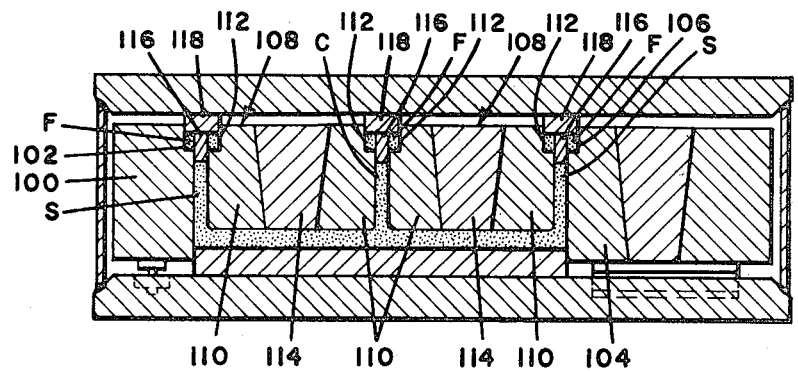
FIG. 3 is a cross-sectional view similar to FIG. 2 showing a further embodiment of the present invention, and, FIG. 4 is a cross-sectional view similar to FIG. 2 showing a still further embodiment of the present invention.

In the embodiment illustrated in FIG. 3, there is shown a workpiece configuration identical in all respects to the configuration of FIG. 2 except for the addition of T-shaped stiffeners F on the flanges S and C. The tooling yoke 100 is substantially similar to the yoke 24 of FIGS. 1 and 2 except for the addition of a notch or recess 102 in which a portion of the flange stiffener F is formed. Side bar 104 is similarly provided with a notch or recess 106 wherein the overhand portion of the flange stiffener F is formed. Support tooling generally designated 108 is divided into three segments in order to permit removal upon disassembly of the encapsulation pack assembly. Mold bars 110 having a notch or recess 112 to form an opposite overhang portion of the flange stiffeners F, are spaced from one another by wedge members 114.

The T-shaped stiffeners F of the flanges S and C are formed with an integral pressure ban 116 of the same basic material as the cubical granules, diffusion molded to the flange and stiffener granules. Pressure members 118 similar to pressure members 66 of FIGS. 1 and 2, are slidably positioned in the cavities forming the stiffeners F as defined by the recesses 102, 106, and 112 of yoke 100, side bar 104, and support tooling 108 respectively. These integral pressure bars 116 serve in a dual function in the diffusion molding of the workpiece of FIG. 3. Initially bars 116 act as a pressure member in the same manner as the pressure members 118 to exert compression force on the loose granules contained in the cavities of the flanges S and S. Thereafter they become an integral part of the flanges C and S of the finished product or workpiece. Thus the loose cubical granules contained within the recesses 102, 106, and 112 of the tooling when acted upon by pressure member 118 while heated to the transition temperature, diffuse to the sides of the bars 116 to form the T-shaped stiffeners F of the flanges C and S.

Figure 4:
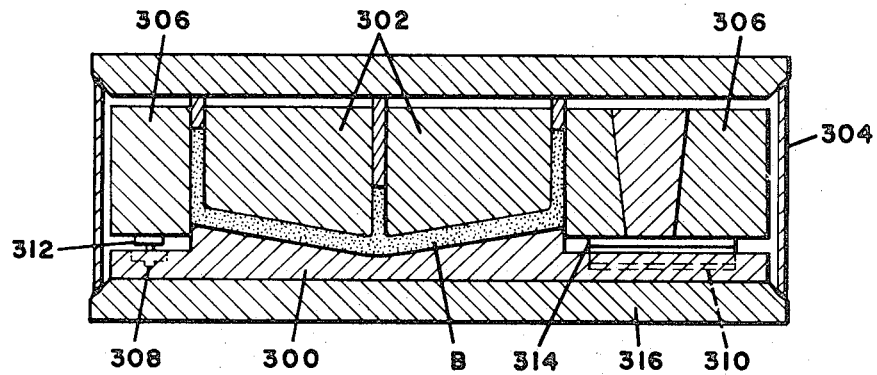

FIG. 4 is exemplary of a workpiece in which the web B thereof is inclined to evolve a V-shaped configuration. The mold bottom plate 300 is provided with a matching concave or V-shaped upper surface to conform to the shape desired. The bottom surface of the support tooling 302 is similarly angled to parallel the incline of the upper surface of the mold plate 300. In this modification, the mold bottom plate 300 extends outwardly towards the sides 304 of the enclosure under the yoke 306. The recesses 308 and 310 for the collapsible supports 312 and 314 respectively may be machined in mold plate 300 as shown in FIG. 4, or if desired, the bottom plate 316 of the enclosure may be made integral with the mold plate 300.

Figure 5:
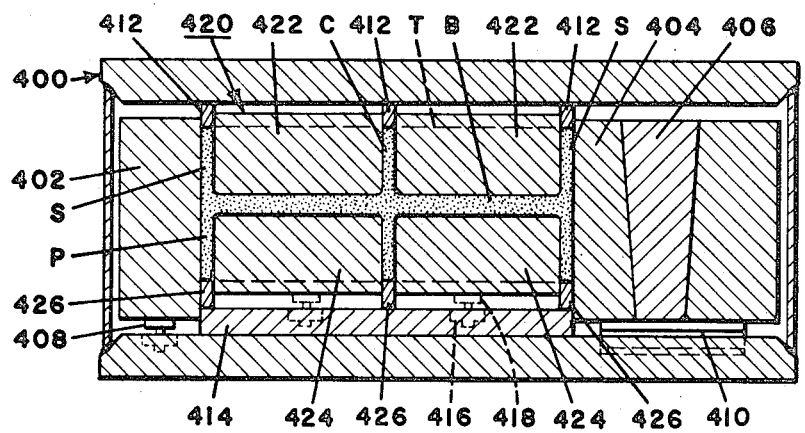
FIG. 5 is a cross-sectional view similar to FIG. 2 showing an encapsulation pack assembly for diffusion molding a further modified form of a workpiece.

The workpiece disclosed in FIG. 5 is of I-beam configuration having flanges C depending from a web B intermediate end flanges S. Enclosure 400 together with yoke 402, side bar 404, wedge bar 406, collapsible supports 408, 410, and pressure members 412, are substantially identical in construction detail to like components 24, 40, 46, 26, 28, and 66 respectively as described in connection with FIGS. 1 and 2. Plate 414 is similarly identical in construction to the mold bottom plate 22 of FIGS. 1 and 2 with the exception that recesses 416 are provided therein to receive collapsible supports 418. Support tooling generally designated 420, comprises upper tooling 422 and lower tooling 424. Lower tooling 424 is elevated above plate 414 by the collapsible supports 418. Upper tooling 422 is spaced directly above lower tooling 424 by a measured quantity of cubical granules as required to obtain the desired thickness of web B of workpiece P. Lower pressure members 426 in vertical alignment with pressure members 412, rest on plate 414 and extend upwardly therefrom into sliding engagement with the mold cavity walls as defined by yoke 402, side bar 404, and lower tooling 424.

In diffusion molding of the workpiece P of FIG. 5, the tooling components including plate 414, yoke 402, side bar 404, wedge bar 406, collapsible supports 408, 410, lower pressure members 426, collapsible supports 418, and lower tooling 424 are assembled on the base of the enclosure 400 in the arrangement as shown in the drawing. It is to be noted that all the encapsulation pack components will have been properly treated prior to assembly to remove all traces of contaminating foreign matter as previously described in connection with the encapsulation pack of FIGS. 1 and 2. A measured quantity of cubical metal granular is then transferred from a holding receptacle containing a suitable cleaning fluid, into the cavities of the mold up to the level of the web B. During the transfer operation, and continuing through the entire mold cavity build-up, the pack assembly is continuously vibrated to align the interfaces of the cubical granules with one another to effect a checkerboard alignment pattern. After filling the mold cavity to the level of web B, the upper tooling 422 is positioned on the granules of web B in vertical alignment with the lower tooling 424. An additional measured quantity of previously cleaned granules is next transferred into the mold cavities of the flanges S, C, and transverse flanges T. Upon filling of the mold cavities, the upper pressure members 412 are positioned in the flange recesses to rest on the loose granules. Thereafter, the enclosure 400 is completed by adding the cover and sides and the encapsulation pack is flushed with Argon gas and evacuated in the manner as perviously described for the FIGS. 1 and 2 embodiment.

Figure 6:
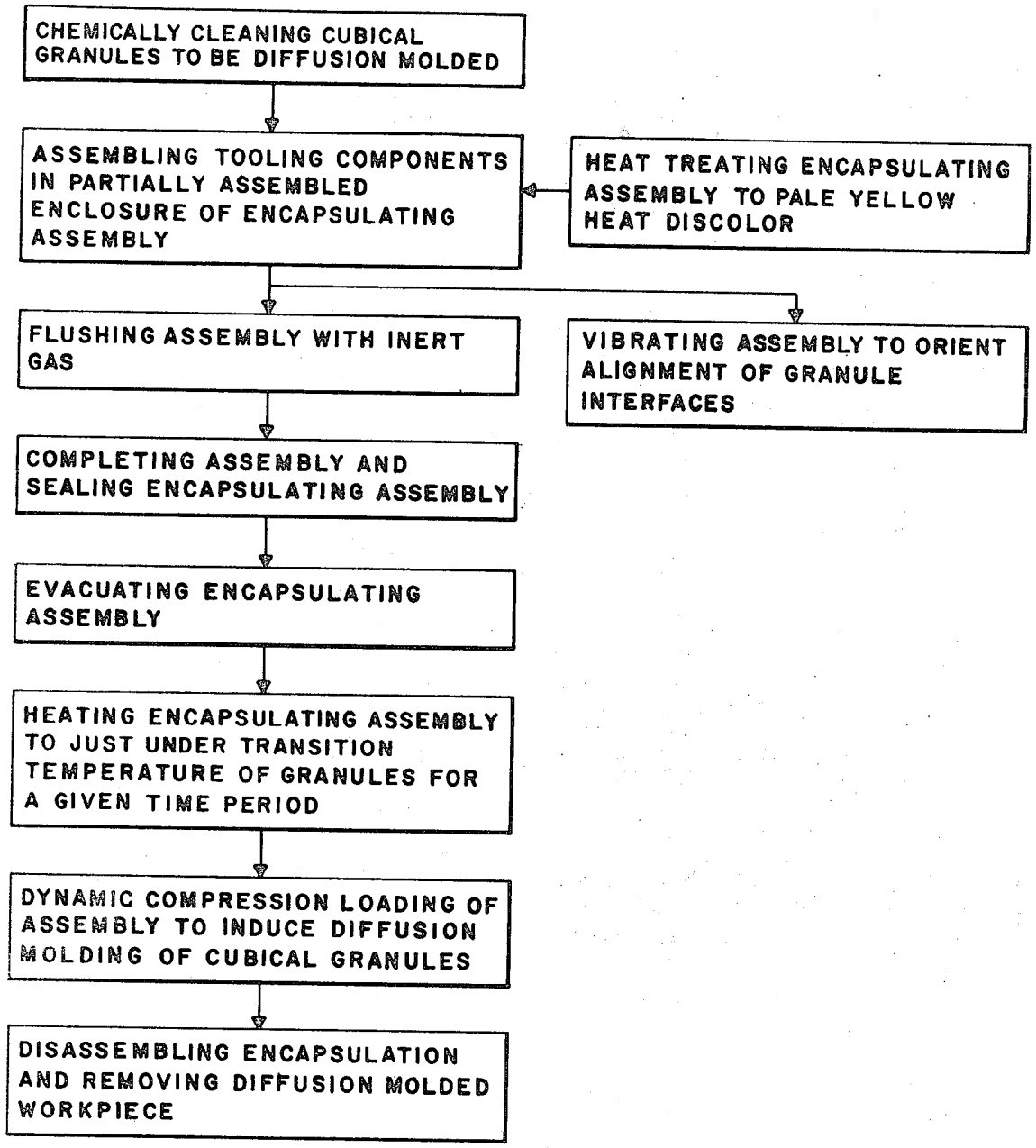
FIG. 6 is a block flow diagram of the steps of the method of the present invention.

Exemplary of the material particularly adaptable to diffusion molding is titanium. Although it has been well documented that titanium is an excellent candidate metal for diffusion molding, the method involved for titanium applies to other metals as well. However, it should be noted that the pressures and heat ranges under which diffusion occurs for a particular metal or metal alloy may vary accordingly without affecting the method as described in detail as follows and illustrated in block diagram form in FIG. 6.

Cubical granules of metallic material are chemically etched to remove all traces of oxide and contaminates from all surfaces thereof and immediately immersed in a retention solution until prior to placement in the cavity of the diffusion mold pack. The retention solution as hereinbefore discussed, may be one of several commercially available solvents such as methylethylketone or deionized water. The cleaned granules are maintained submerged in the retention solution until such time as they are to be placed in the diffusion mold cavity. This protects the surfaces of the cubical granules to be joined to one another from oxidation and contamination.

The encapsulation assemblies of FIGS. 1 through 5 each include elements that are structurally similar to one another. Consequently the preliminary preparation common to each will be described using the embodiment shown in FIGS. 1 and 2 as the drawing reference.

Prior to assembly, the individual parts of the encapsulation assembly are heat treated to obtain the previously described oxide coating. This coating provides for reusability of the assembly components in addition to serving as a parting agent to facilitate disassembly thereof for removal of the finished diffusion molded workpiece. The preliminary preparation further includes fusion welding of the conduit 68 to the yoke 24.

The encapsulation assembly components are now assembled as previously described in the order shown in the drawings. The cleaned granules are transferred into the mold cavities in a measured quantity after being air dried with Argon gas. During the transfer operation, the encapsulation assembly is continuously vibrated while Argon gas is conducted into the assembly through the conduit 68. Upon filling of the mold cavities to the proper level, the pressure members 66 are installed, and cover plate 18 positioned thereon. Sides 16 are next welded in place to seal and complete the assembly.

As previously discussed, the vibration of the encapsulation assembly during and after the transfer of granules into the mold cavity is of prime importance in producing high quality, high density molded structures or workpieces. The vibrating machine used for such purpose may be of a commercial type which is adjustable so as to vibrate at a selected frequency over a wide range of frequencies. Such vibration is to insure that the cubical granules are properly oriented into a checkerboard pattern whereby the resultant molded structure will be of maximum density of the basic metal of the individual granules.

The embodiments described above and shown in the accompanying drawings are illustrative of specific forms of the present invention. The present embodiments are therefore to be considered in all respects illustrative and not restrictive, and all changes which come within the meaning and range of equivalency of the claims are therefore intended to be embraced therein.

What is claimed and desired to be secured by Letters Patent is:

1. The method of diffusion molding comprising the steps of
   providing metallic cubical granules of substantially uniform size,
   cleaning said granules to substantially remove surface contamination,
   depositing said cleaned granules into a cavity within first tooling,
   vibrating said first tooling to orient the interfaces of said cubical granules into alignment with one another,
   encapsulating said first tooling in a sealed enclosure,
   evacuating said enclosure,
   heating said enclosure for a given period of time,
   applying pressure to said enclosure to induce diffusion of said granules contained in said cavity to diffusion bond said granules into a unitary workpiece, and
   removing said workpiece from said enclosure and said cavity.

2. The method of diffusion molding cubical metallic granules into a workpiece as defined in claim 1 including the additional step of:
   cleaning said cavity within said first tooling to substantially remove surface contamination therefrom prior to depositing said cleaned granules therein.

3. The method of diffusion molding cubical metallic granules into a workpiece as defined in claim 2 including the additional step of:
   placing collapsible support means between said first tooling and said enclosure.

4. The method of diffusion molding cubical metallic granules into a workpiece as defined in claim 3 including the additional steps of:
   placing internal second tooling on said cleaned granules within said cavity, and
   depositing additional cleaned granules between said first tooling and said internal second tooling.

5. The method of diffusion molding cubical metallic granules into a workpiece as defined in claim 4 including the additional step of:
   assembling pressure members between said first tooling and said internal second tooling.

References Cited

UNITED STATES PATENTS 3,631,583  1/1972  Haller _____ 264—111
3,476,599  11/1969  Grover et al. _____ 264—39

ROBERT F. WHITE, Primary Examiner

J. R. HALL, Assistant Examiner

U.S. Cl. X.R.

264—71, 102, 111